United States Patent
Nomachi et al.

(10) Patent No.: US 8,868,024 B2
(45) Date of Patent: Oct. 21, 2014

(54) PORTABLE ELECTRONIC APPARATUS, SWITCHING CONTROL METHOD AND CONTROL PROGRAM

(75) Inventors: Nayu Nomachi, Kanagawa (JP); Hiroyuki Bamba, Kanagawa (JP); Hisae Honma, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 253 days.

(21) Appl. No.: 13/349,103

(22) Filed: Jan. 12, 2012

(65) Prior Publication Data

US 2012/0184245 A1 Jul. 19, 2012

(30) Foreign Application Priority Data

Jan. 14, 2011 (JP) ................................. 2011-006268

(51) Int. Cl.
  *H04M 11/04* (2006.01)
  *H04M 1/725* (2006.01)
  *H04W 12/12* (2009.01)
  *H04M 1/57* (2006.01)

(52) U.S. Cl.
  CPC .......... *H04W 12/12* (2013.01); *H04M 1/72536* (2013.01); *H04M 1/72552* (2013.01); *H04M 1/72588* (2013.01); *H04M 1/57* (2013.01)
  USPC ...................... 455/404.1; 340/571; 340/572.1

(58) Field of Classification Search
  USPC .......... 455/410, 41.2, 419, 420, 404.1, 404.2, 455/421, 456.3, 414.1, 404, 456, 67.1; 340/571, 572.1; 235/382
  See application file for complete search history.

(56) References Cited

U.S. PATENT DOCUMENTS

2004/0120502 A1* 6/2004 Strathmeyer et al. .... 379/265.01

FOREIGN PATENT DOCUMENTS

| JP | 2004-140710 A | 5/2004 |
| JP | 2005-123882 A | 5/2005 |
| JP | 2006-270727 A | 10/2006 |
| JP | 2007-082122 A | 3/2007 |
| JP | 2008-061153 A | 3/2008 |
| JP | 2008-109396 A | 5/2008 |

OTHER PUBLICATIONS

Mitsuyoshi_Mobile Phone_Toshiba_pub.date-2008-05-08_ JP2008-109396A.pdf.*
Teruo_Portable Telephone Set and Method of Communicating Emergency Information_Matsushita Electric_pub.date-2005-12-08_JP2005-341302A.pdf.*
An Office Action; "Notice of Reason for Rejection," issued by the Japanese Patent Office on Jul. 14, 2014, which corresponds to Japanese Patent Application No. 2011-006268 and is related to U.S. Appl. No. 13/349,103; with English language concise explanation.

* cited by examiner

*Primary Examiner* — Kwasi Karikari
*Assistant Examiner* — Alexander Yi
(74) *Attorney, Agent, or Firm* — Studebaker & Brackett PC

(57) ABSTRACT

A portable electronic apparatus is provided. The portable electronic apparatus includes a display section, an operating section, a setting section which switches and sets, based on an operation to the operating section, a pseudo power-off mode in which electric power is not supplied to the display section and a crime prevention function is enabled and a power-on mode in which the electric power is supplied to the display section and entire functions including the crime prevention function are enabled, and a control section which switches the pseudo power-off mode into the power-on mode when the crime prevention function is used in a state where the pseudo power-off mode is set by the setting section.

9 Claims, 7 Drawing Sheets

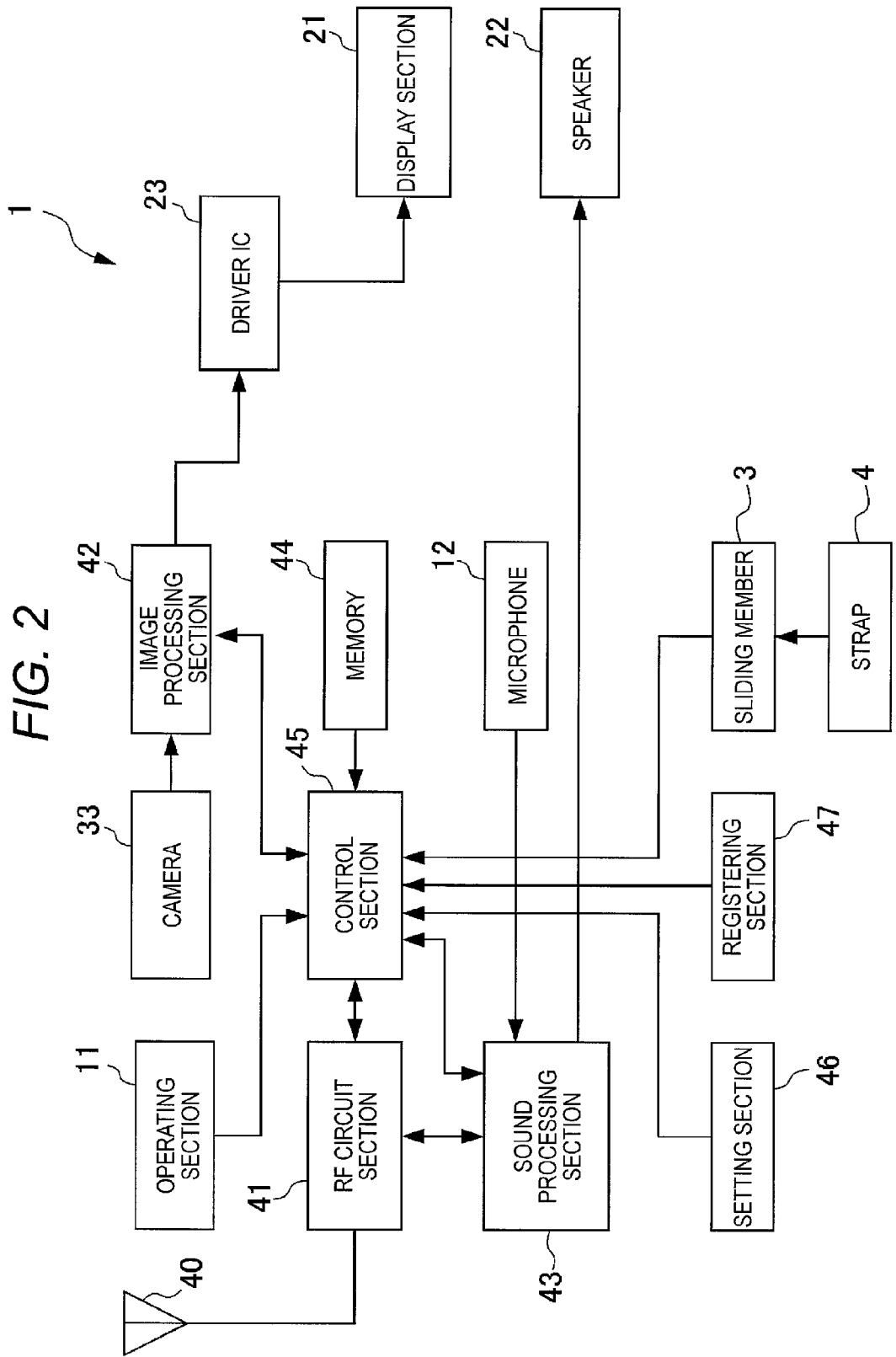

FIG. 3

| | CALLING PARTY IS REGISTERED IN ADDRESS BOOK | CALLING PARTY IS NOT REGISTERED IN ADDRESS BOOK | CALL BACK FROM EMERGENCY CONTACT ADDRESS |
|---|---|---|---|
| PSEUDO POWER-OFF MODE [MEMORY IS NOT FULL] | SIMPLE MESSAGE RECORDING (LEAVE AS INCOMING CALL HISTORY) | REJECT INCOMING CALL *1 (GUIDANCE IS PRESENT, SCREEN IS NOT DISPLAYED) | NORMAL INCOMING CALL *3 |
| PSEUDO POWER-OFF MODE [MEMORY IS FULL] | REJECT INCOMING CALL *2 | *1 | *3 |
| POWER-OFF MODE | NO CONNECTION (SAME AS IN NORMAL TERMINAL) | NO CONNECTION (SAME AS IN NORMAL TERMINAL) | NO CONNECTION (SAME AS IN NORMAL TERMINAL) |
| POWER-ON MODE | *3 | *1 | *3 |

T1

FIG. 7
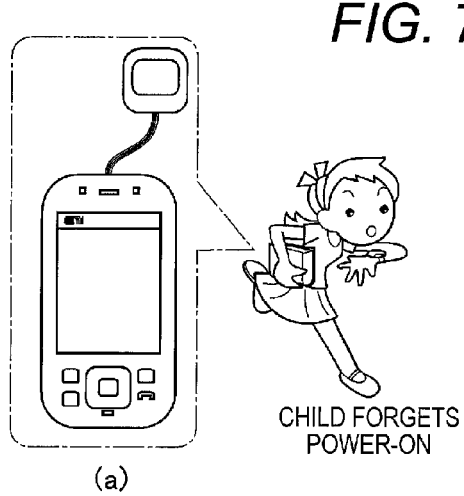
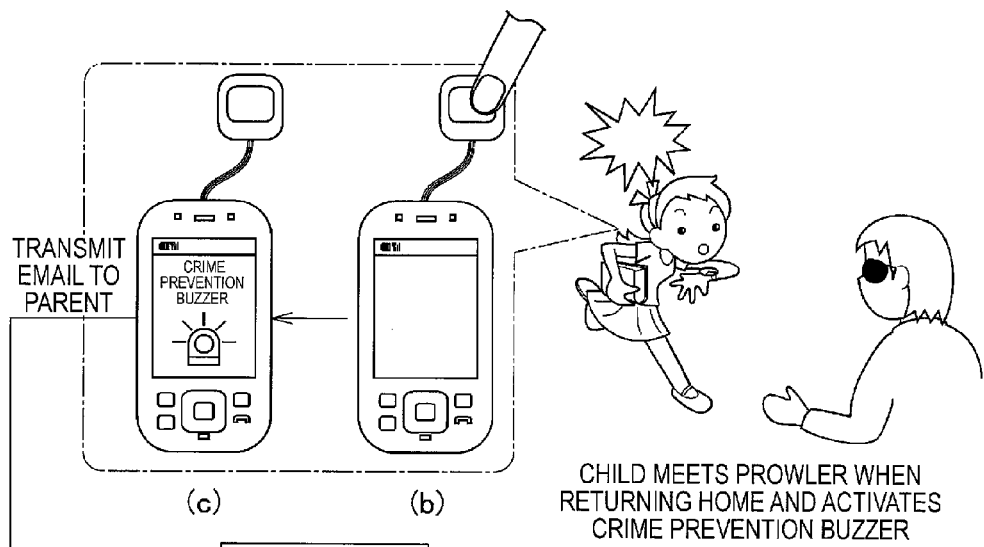
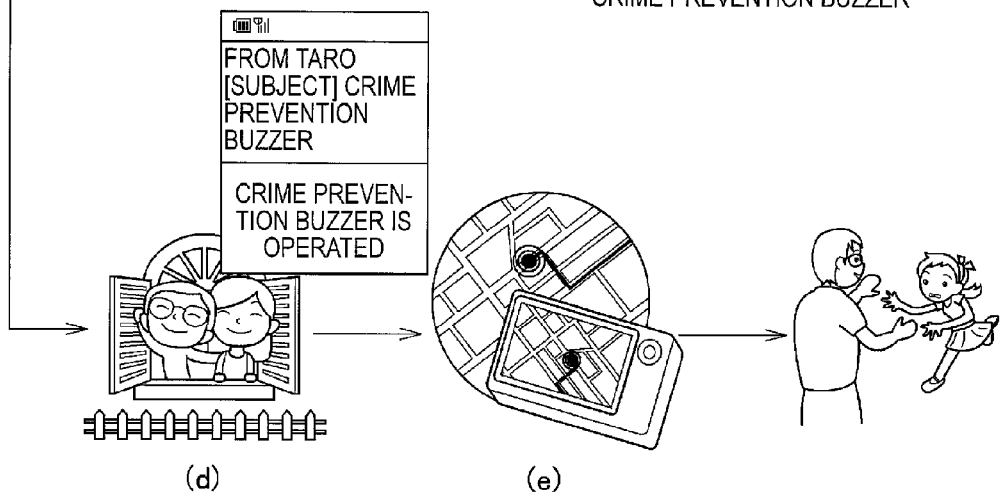

PORTABLE ELECTRONIC APPARATUS, SWITCHING CONTROL METHOD AND CONTROL PROGRAM

CROSS-REFERENCE TO RELATED APPLICATION

This application claims priority from Japanese Patent Application No. 2011-006268, filed on Jan. 14, 2011, the entire subject matter of which is incorporated herein by reference.

BACKGROUND OF THE INVENTION

1. Field of the Invention

The present invention relates to a portable electronic apparatus having a communication function, a switching control method and a control program.

2. Description of the Related Art

Generally, in a portable electronic apparatus, at a power-on state, a user can use a variety of functions such as a phone call, and at a power-off state, since the supply of electric power is cut off, the user cannot use those functions.

Thus, in the portable electronic apparatus, if the power supply is turned off immediately after communication with an emergency facility, position information or the like may not be acquired, and thus, it is difficult to cope with an emergency situation.

JP-A-2008-109396 proposes a technique in which if a power-off operation is received within a predetermined time after an audio communication line is disconnected in a state where audio information and position calculating information are transmitted in parallel to an emergency facility from a portable electronic apparatus, outputs through a liquid crystal display panel or a speaker and key operation are restricted as if the portable electronic apparatus is at a power-off state (pseudo power-off state), but electric power of a control section or a transmitting and receiving section is not cut off so as to continue transmitting the position calculating information.

However, according to the technique of JP-A-2008-109396, in a state where the power supply is turned off in a pseudo manner, most of the variety of functions cannot be used. Thus, in order to use those functions at a power-on state, a user have to perform an operation for turning on the power supply.

SUMMARY OF THE INVENTION

Accordingly, an aspect of the present invention provides a portable electronic apparatus, a switching control method and a control program which are capable of simply turning on a power supply in a state where the power supply is off in a pseudo manner.

According to an illustrative embodiment of the present invention, there is provided a portable electronic apparatus comprising: a display section; an operating section; a setting section which switches and sets, based on an operation to the operating section, a pseudo power-off mode in which electric power is not supplied to the display section and a crime prevention function is enabled and a power-on mode in which the electric power is supplied to the display section and entire functions including the crime prevention function are enabled; and a control section which switches the pseudo power-off mode into the power-on mode when the crime prevention function is used in a state where the pseudo power-off mode is set by the setting section.

According to another illustrative embodiment of the present invention, there is provided a switching control method comprising: switching and setting, based on an operation to an operating section, a pseudo power-off mode in which electric power is not supplied to a display section and a crime prevention function is enabled and a power-on mode in which the electric power is supplied to the display section and entire functions including the crime prevention function are enabled; and switching the pseudo power-off mode into the power-on mode when the crime prevention function is used in a state where the pseudo power-off mode is set in the switching and setting.

According to a further illustrative embodiment of the present invention, there is provided a non-transitory computer-readable medium having a control program stored thereon and readable by a computer, the control program, when executed by the computer, causing the computer to perform operations comprising: switching and setting, based on an operation to an operating section, a pseudo power-off mode in which electric power is not supplied to a display section and a crime prevention function is enabled and a power-on mode in which the electric power is supplied to the display section and entire functions including the crime prevention function are enabled; and switching the pseudo power-off mode into the power-on mode when the crime prevention function is used in a state where the pseudo power-off mode is set in the switching and setting.

According to the above configuration, it is possible to simply turn on the power supply in a state where the power supply is off in a pseudo manner.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 2 is a diagram illustrative functional blocks of the portable phone;

FIG. 3 is a diagram illustrating a table referenced when a portable phone receives an incoming call in respective states (pseudo power-off mode, power-off mode, and power-on mode);

FIG. 7 is a diagram illustrating operations of a portable phone of a child returning from a school and a portable terminal of a parent.

DETAILED DESCRIPTION OF THE INVENTION

Figure 1:
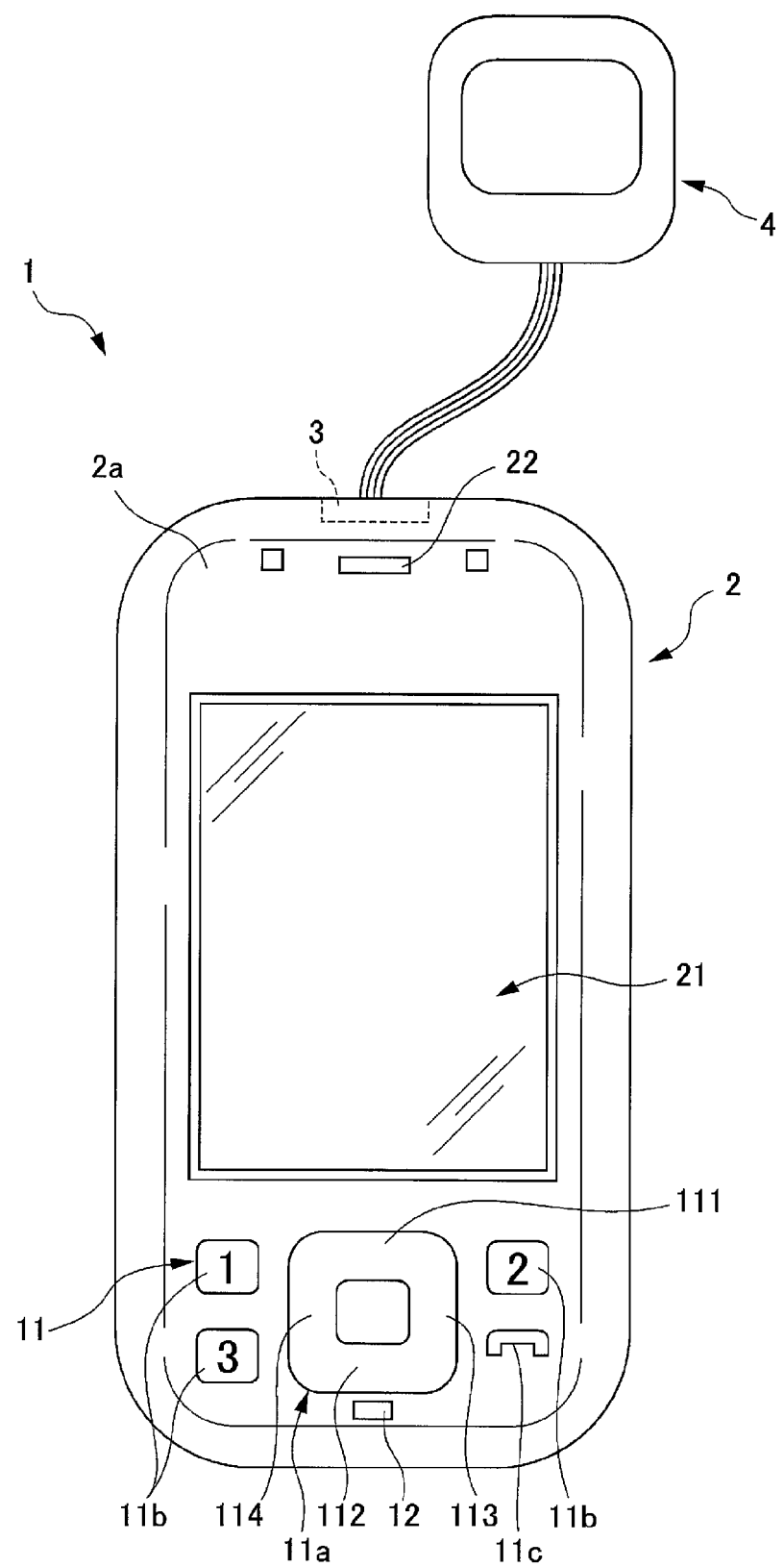
FIG. 1 is a perspective view illustrating an outer appearance of a portable phone.

Hereinafter, illustrative embodiments of the present invention will be described with reference to the accompanying drawings. Firstly, a basic configuration of a portable phone 1 according to an illustrative embodiment of the invention will be described with reference to FIG. 1. FIG. 1 is a perspective view illustrating the outer appearance of the portable phone 1.

The portable phone 1 is a straight type. The portable phone 1 includes a casing 2, and a sliding member 3 which is installed to slide by a predetermined amount in a specific direction with respect to the casing 2, and a strap 4 which is connected to the sliding member 3. The portable phone 1 has a crime prevention buzzer function in addition to a call function. The crime prevention buzzer function is a function that when a user senses danger, the user performs a predetermined operation of the portable phone 1 to generate a loud sound and to draw the attention of people around the user. Specifically, if the strap 4 is pulled by a force of a predetermined level or higher, the sliding member 3 slides by the predetermined amount in the specific direction. By using the sliding as a trigger, the crime prevention buzzer sounds loudly to thereby draw attention of people around the user. In this case, a control section 45 (which will be described later) receives a notice indicating that the crime prevention buzzer sounds as the strap 4 is pulled by the force of the predetermined level or higher, and sends an urgent notification to an associated security company or the like using a function of an email or the like.

Further, the casing 2 includes an operating section 11, a display section 21, a microphone 12 and a speaker 22 arranged on a front surface 2a. The operating section 11 includes a plurality of direction designation keys 11a which designates respective directions, functional operation keys 11b for operating a predetermined function, and an end key 11c. Here, even in a case where the plurality of direction designation keys 11a physically correspond to one key, as shown in FIG. 1, if the respectively different functions are allocated in upper, right, down and left directions, these are considered as the plurality of direction designation keys. In the present illustrative embodiment, the direction designation keys 11a include an up key 111 which designates the upper direction, a down key 112 which designates the down direction, a right key 113 which designates the right direction, and a left key 114 which designates the left direction. It is sufficient that the direction designation keys 11a designate the plurality of directions, and thus, the direction designation keys 11a may be a joy stick, a track ball or a pointing device.

The display section 21 includes a liquid crystal display, an organic electroluminescent (EL) display or the like. The microphone 12 receives sound generated by the user of the portable phone 1 during phone call. The speaker 22 outputs sound of the other party when the portable phone 1 is used.

The portable phone 1 is not limited to the above-described straight type. That is, the portable phone may be a slide type in which from a state where a casing of the operating section side and a casing of the display section side are overlapped, one casing slides in one direction, a rotary type in which one casing rotates around an axial line along the overlapped direction, or a folding type in which a casing of the operating section side and a casing of the display section side are connected by a biaxial hinge or a casing of the operating section side and a casing of the display section side are joined by a hinge mechanism.

Next, a functional configuration of the portable phone 1 will be described. FIG. 2 is a diagram illustrative functional blocks of the portable phone 1. The portable phone 1 includes the operating section 11, the microphone 12, a main antenna 40, an RF circuit section 41, an image processing section 42, a sound processing section 43, a memory 44, a control section 45, the display section 21, the speaker 22, and a driver IC 23. Further, the portable phone 1 includes the sliding member 3 and the strap 4, and if the strap 4 is pulled by the force of the predetermined level or higher, the sliding member 3 slides by the predetermined amount in a direction, which is notified to the control section 45.

The main antenna 40 has a configuration of performing communication with an external device such as a base station at a predetermined usage frequency (for example, 800 MHz). In the present illustrative embodiment, 800 MHz is used as the predetermined usage frequency, but a different frequency band may be used.

The RF circuit section 41 demodulates a signal received by the main antenna 40 and supplies the demodulated signal to the control section 45. Further, the RF circuit section 41 modulates the signal supplied from the control section 45 and transmits the modulated signal to an external device through the main antenna 40. Further, the RF circuit section 41 notifies the control section 45 of the strength (RSSI, Received Signal Strength Indication) of the signal received by the main antenna 40.

The image processing section 42 performs a predetermined image processing under the control of the control section 45 and outputs image data after processing to the driver IC 23. The driver IC 23 stores the image data supplied from the image processing section 42 in a frame memory, and then outputs the image data to the display section 21 at a predetermined timing.

The sound processing section 43 performs a predetermined sound processing for the signal supplied from the RF circuit section 41 under the control of the control section 45, and then outputs the signal, after processing, to the speaker 22. The speaker 22 outputs the signal supplied from the sound processing section 43 to the outside.

Further, the sound processing section 43 processes the signal input through the microphone 12 under the control of the control section 45, and outputs the signal after processing to the RF circuit section 41. The RF circuit section 41 performs a predetermined process for the signal supplied from the sound processing section 43 and outputs the signal, after processing, to the main antenna 40.

The memory 44 includes, for example, a working memory, and is used for a calculation process in the control section 45. Further, a plurality of applications or a variety of tables or the like necessary for the applications are stored in the memory 44. Further, the memory 44 may include a detachable external memory.

The control section 45 controls the entire portable phone 1 and is configured by a central processing unit (CPU) or the like.

The portable phone 1 with such a configuration has a function in which a crime prevention function is used in a state where electric power is cut off in a pseudo manner. Hereinafter, a configuration and an operation for realizing the function relating to the portable phone 1 will be described in detail.

As shown in FIG. 2, the portable phone 1 includes a setting section 46. The setting section 46 switches and sets a pseudo power-off mode in which the electric power is not supplied to the display section 21 and the crime prevention function is enabled by the operation of the operating section 11 and a power-on mode in which the electric power is supplied to the display section 21 and the entire functions including the crime prevention function are enabled. For example, a configuration in which the setting of the setting section 46 is performed by pressing a predetermined key of the operating section 11 may be used, or a configuration in which the setting of the setting section 46 is performed by tracking a predetermined route from a menu may be used.

In a state where the pseudo power-off mode is set by the setting section 46, when the crime prevention function is used, the control section 45 automatically switches the pseudo power-off mode into the power-on mode.

The crime prevention function may include a function of causing the crime prevention buzzer to sound and sending an urgent notice to an associated security company or the like using a function of email or the like. The urgent notice includes position information of the portable phone 1. If the security company or the like receives the urgent notice, the security company sends a security guard who patrols the vicinity of the place found from the position information, or contacts a police station, for crime prevention. Further, the crime prevention function may include receiving an incoming email or call from a predetermined address, an incoming call from an emergency contact number, or the like.

Further, the pseudo power-off mode is a mode in which lighting control for the display section 21 or an operation through the operating section is disabled as if the portable phone 1 were at the power-off mode (in which the electric power supply from a power source is cut off and the entire functions relating to the portable phone 1 cannot be used), but the electric power is actually supplied to the control section 45 or the like and the function relating to the crime prevention can be used. Further, when the portable phone 1 is set in the pseudo power-off mode, since the portable phone 1 does not transmit or receive a call or email and does not perform an operation relating to the call or email (for example, an operation of lighting an LED in response to an incoming call or the like), there is no risk of causing troubles to people in a class or the like.

Further, in a state where the pseudo power-off mode is set by the setting section 46, when the crime prevention function is used, that is, when the strap 4 is pulled by the force of the predetermined level or higher, the sliding member 3 slides by a predetermined amount in a specific direction, and this situation is notified, the control section 45 switches the pseudo power-off mode into the power-on mode.

Accordingly, in the state where the pseudo power-off mode is set by the setting section 46, the portable phone 1 does not cause any trouble to surrounding people at the time of an incoming call or the like. On the other hand, in case of emergency, it is possible to immediately switch the pseudo power-off mode into the power-on mode in response to that the crime prevention function is used.

Thus, the user can immediately switch the pseudo power-off mode into the power-on mode by a simple operation in case of emergency, so that a user can call a police station or the like, thereby effectively achieving crime prevention.

Further, the portable phone 1 has a crime prevention key for activating the crime prevention buzzer as one of the crime prevention functions. Here, in the present illustrative embodiment, the crime prevention key includes the sliding member 3 and the strap 4, but is not limited thereto. For example, the crime prevention key may have a configuration in which a predetermined key is provided on the front surface 2a, a side or the like. The crime prevention buzzer is activated by pressing the predetermined key.

When the crime prevention key is operated in the state where the pseudo power-off mode is set by the setting section 46, the control section 45 may determine that the crime prevention function is used, activate the crime prevention buzzer, and switch the pseudo power-off mode into the power-on mode.

Accordingly, since the portable terminal 1 can switch the pseudo power-off mode into the power-on mode by a simple operation in a state where the portable phone 1 is set in the pseudo power-off mode, it is possible to immediately call a police station or the like in case of an emergency.

Further, as shown in FIG. 2, the portable phone 1 includes a registering section 47 which stores a predetermined address registered therein. When receiving an incoming email or call from the predetermined address registered in the registering section 47 in a state where the pseudo power-off mode is set by the setting section 46, the control section 45 may determine that the crime prevention function is used, and switch the pseudo power-off mode into the power-on mode.

The registering section 47 stores a so-called address book which is a table for managing a name, a telephone number, an email address or the like for each user. Further, the registering section 47 has a function of setting a user whose incoming email or call is allowed to receive in the pseudo power-off mode from the registered users.

Further, when receiving incoming emails or calls at predetermined times or more from a predetermined address in the pseudo power-off mode, the control section 45 may switch the pseudo power-off mode into the power-on mode.

In this way, when receiving incoming emails or calls from the predetermined address in a state where the pseudo power-off mode is set, since the portable phone 1 switches the pseudo power-off mode into the power-on mode, it is possible to receive only contact from the predetermined address.

When the pseudo power-off mode is set by the setting section 46 based on an operation to the operating section 11, the control section 45 may transmit an email to a predetermined address with reference to the registering section 47.

For example, when the portable phone 1 (assumed to be owned by a child) is set in the pseudo power-off mode at arriving at a school, if the predetermined address registered in the registering section 47 is an email address of a portable phone of a child's parent, the portable phone 1 automatically transmits an email indicating the fact to the parent. Accordingly, the parent comes to know that the portable phone 1 is set in the pseudo power-off mode, and for example, comes to know that the child arrives at the school.

In this way, when the portable phone 1 is set in the pseudo power-off mode, the portable phone 1 can automatically notify the fact to the predetermined address.

When receiving an incoming call in a state where the pseudo power-off mode is set by the setting section 46, the control section 45 may switch the portable phone 1 into a message-recording mode which records a message from a transmitting source of the incoming call if the incoming call is from a predetermined address which is registered in the registering section 47, and may not switch the portable phone 1 into the message-recording mode if the incoming call is from an address which is not registered in the registering section 47.

Here, the portable phone 1 has the message-recording function of presenting a predetermined message when receiving an incoming call and recording the message of the other party, based on an operation to the operating section 11.

When receiving an incoming call in a state where the pseudo power-off mode is set by the setting section 46, if the incoming call is from the predetermined address which is registered in the registering section 47, the portable phone 1 records the message from the transmitting source as the message-recording telephone function is in an on-state.

Further, when receiving an incoming call in a state where the pseudo power-off mode is set by the setting section 46, if the incoming call is from an address which is not registered in the registering section 47, the message-recording telephone function of the portable phone 1 is not in the on-state. Accordingly, in this case, a predetermined message, for example, indicating that the power source is currently turned off is presented to the other party who makes a call to the portable phone 1.

In this way, even in a state where the pseudo power-off mode is set, if the incoming call is from a predetermined transmitting source, since the portable phone 1 sets the message-recording telephone function to the on-state, it is possible to record the message from the predetermined transmitting source and to reproduce the message when the pseudo power-off mode is switched into the power-on mode.

Further, if the pseudo power-off mode is set, since the electric power supplied to the display section 21 is cut off and a general operation through the operating section 11 is disabled, it is difficult to identify whether the pseudo power-off mode or the power-on mode is set, in the portable phone 1. Thus, with such a configuration described hereinafter, it is possible to easily confirm whether the set mode is the pseudo power-off mode or the power-on mode.

The setting section 46 can further set the mode into the power-off mode in which the electric power is not supplied to the display section 21 and the entire functions are disabled, based on an operation to the operating section 11. When the pseudo power-off mode is set by the setting section 46 based on an operation to the operating section 11, the control section 45 controls the display section 21 to display a display screen which is different from a display screen displayed on the display section 21 when the power-off mode is set for a predetermined time and then controls the electric power supplied to the display section 21 to be cut off.

For example, the memory 44 stores first image data for a display screen and a second image data which is different from the first image data. When the power-off mode is set, the control section 45 reads the first image data from the memory 44 to display it on the display section 21, terminates a program during operation, and turns off the power source. When the pseudo power-off mode is set, the control section 45 reads the second image data from the memory 44 to display it on the display section 21, operates only a necessary program, and cuts off the electric power supplied to the display section 21.

In this way, since the portable phone 1 displays different display screens on the display section 21 when the power-off mode is set and when the pseudo power-off mode is set, it is possible to easily confirm whether the set mode is the pseudo power-off mode or the power-off mode.

Further, when receiving an incoming call from an emergency contact address in a state where the pseudo power-off mode is set by the setting section 46, the control section 45 determines that the crime prevention function is used, switches the pseudo power-off mode into the power-on mode, and receives the incoming call from the corresponding emergency contact address.

The emergency contact address may be an address which is designated in advance from the addresses registered in the address book, or may be an address which is called back from the police station after the portable phone 1 contacts the police station, for example.

In this way, since the portable phone 1 switches the pseudo-power off mode into the power-on mode under certain conditions even in a state where the pseudo power-off mode is set, it is possible to receive the incoming call from the emergency contact address in case of an emergency.

Further, when the control section 45 switches the pseudo-power off mode into the power-on mode as the crime prevention function is used, the control section 45 may switch the power-on mode into the pseudo power-off mode again after a predetermined time elapses. Here, the predetermined time may vary according to the type of the crime prevention function.

With such a configuration, in the portable terminal 1, since the pseudo power-off mode is automatically switched to the power-on mode by using the crime prevention function and the power-on mode is automatically switched to the pseudo power-off mode after the predetermined time elapses, it is possible to reduce the burden of the operation.

Next, the table T1 referenced when the portable phone 1 receives an incoming call in the respective states (pseudo power-off mode, power-off mode, and power-on mode) will be described with reference to FIG. 3. In the pseudo power-off mode, in a state where the function of the message-recording telephone is turned on, a case where there is available capacity for recording a message (memory is not full) and a case where there is no available capacity in the memory (memory is full) will be described. The table T1 is stored in the memory 44.

In a state where the pseudo power-off mode is set and the memory is not full, when receiving an incoming call from the other party who is registered in the address book, the control section 45 switches the pseudo power-off mode into the power-on mode to record a message as a simple message recording. In this case, since the control section 45 stores information about a transmitting source and an incoming call time as an incoming call history, when the pseudo power-off mode is switched to the power-on mode, the control section 45 displays the incoming call history on the display section 21. Further, the control section 45 may switch the mode into the power-on mode to perform a normal incoming call.

In a state where the pseudo power-off mode is set and the memory is not full, when receiving an incoming call from the other party who is not registered in the address book, the control section 45 rejects the incoming call. In this case, a first guidance (for example, "Your address is not registered in the address book, and your call cannot be connected.") is presented to the terminal of the other party.

In a state where the pseudo power-off mode is set and the memory is not full, in a case where there is a call back from an emergency contact address, the control section 45 switches the pseudo power-off mode into the power-on mode to perform a normal incoming call. The power-on mode is maintained for a call back waiting time (for example, 5 minutes).

In a state where the pseudo power-off mode is set and the memory is full, when receiving an incoming call from the other party who is registered in the address book, the control section 45 rejects the incoming call. In this case, a second guidance (for example, "Memory is not enough for recording. You cannot leave a message.") which is different from the first guidance is presented to the terminal of the other party. The control section 45 may store information about the transmitting source and the incoming call time as an incoming call history, and may display the incoming call history on the display section 21 when the pseudo power-off mode is switched to the power-on mode.

In a state where the pseudo power-off mode is set and the memory is full, when receiving an incoming call from the other party who is not registered in the address book, the control section 45 rejects the incoming call. In this case, the first guidance is presented to the terminal of the other party.

In a state where the pseudo power-off mode is set and the memory is full, when receiving a call back from the emergency contact address, the control section 45 switches the pseudo power-off mode into the power-on mode to perform a normal incoming call.

The control section 45 rejects all incoming calls in the power-off mode. In the power-on mode, when receiving an incoming call from the other party who is registered in the address book, and when a call back is received from the emergency contact address, the control section 45 performs a normal incoming call.

When receiving an incoming call from the other party who is not registered in the address book in the power-on mode, the control section 45 rejects the incoming call. In this case, the first guidance is presented to the terminal of the other party.

Next, with reference to FIGS. 4 to 7, there will be described a process between the portable phone 1 and a portable terminal 100 in an example where a user of the portable phone 1 is a child and the child goes to school and returns home from school, and the portable terminal 100 is used by a parent.

Figure 4:
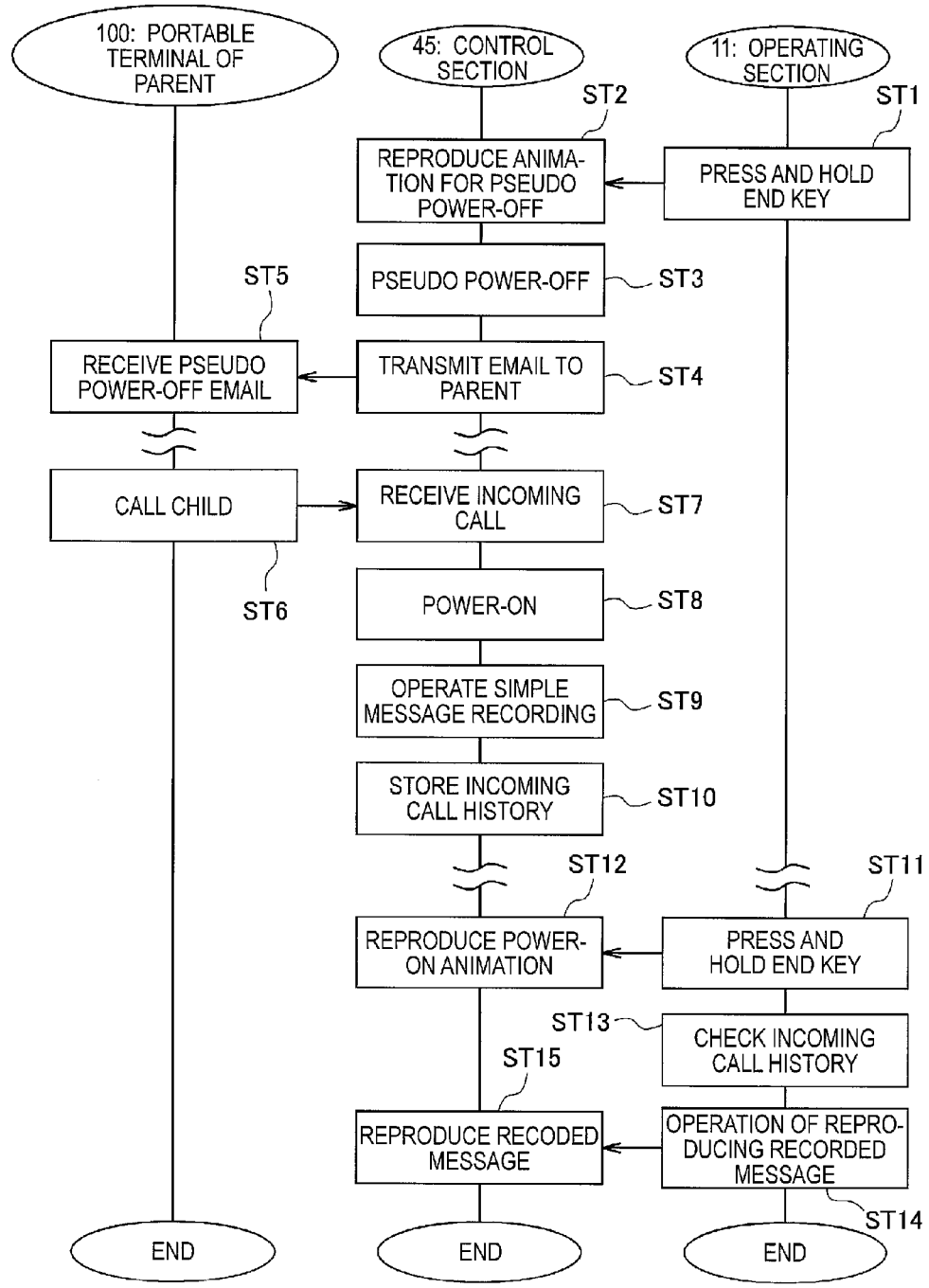
FIG. 4 is a flowchart illustrating operations of a portable phone of a child going to school and a portable terminal of a parent.

Firstly, a process when the child is going to a school will be described with reference to FIGS. 4 and 5.

Figure 5:
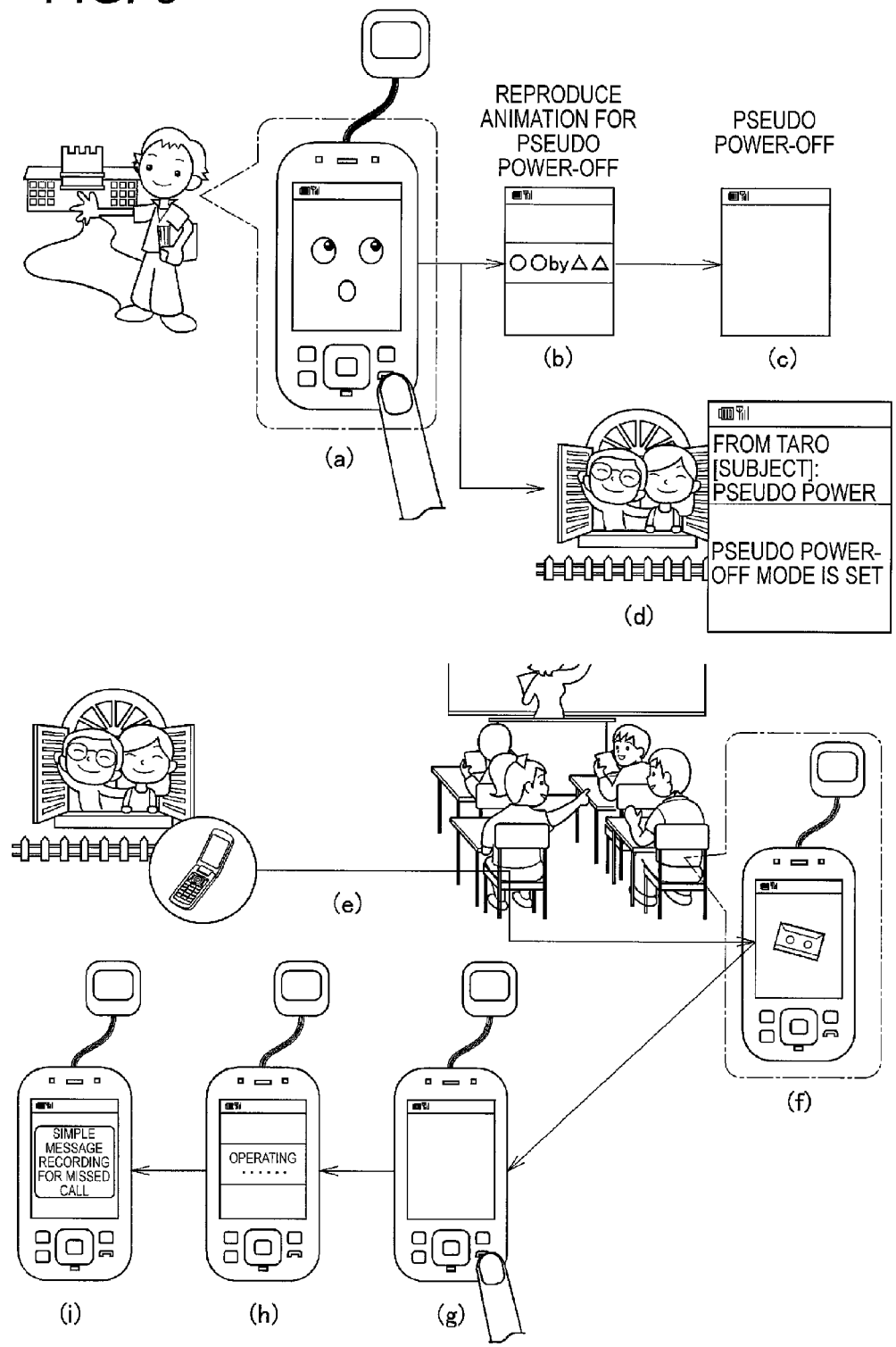
FIG. 5 is a diagram illustrating operations of a portable phone of a child going to school and a portable terminal of a parent.

In step ST1, the end key 11*c* is pressed and held by the user (child) (see FIG. 5(*a*)).

In step ST2, the control section 45 detects the press and hold of the end key 11*c* and switches the power-on mode into the pseudo power-off mode. At this time, the display image for the pseudo power-off mode is displayed on the display section 21 (see FIG. 5(*b*)).

In step ST3, the control section 45 cuts off the supply of the electric power to a backlight to switch the mode into the pseudo power-off mode. As shown in FIG. 5(*c*), the display section 21 is in a black state as the backlight is turned off as in the power-off mode.

In step ST4, the control section 45 transmits the email for notifying the fact that the mode is switched to the pseudo power-off mode to the portable terminal 100 of the parent (for example, a predetermined address registered in the registering section 47) (see FIG. 5(*d*)). The email address of the portable terminal 100 of the parent is registered in advance. The portable phone 1 has a function of creating an email for notifying the fact (for example, the email content is "Pseudo power-off", or the like) and transmitting the created email to the portable terminal 100 of the parent when the mode is switched into the pseudo power-off mode.

In step ST5, the portable terminal 100 of the parent receives the email transmitted by the operation of step ST4. The parent comes to know by this email that the mode of the portable phone of the child 1 is switched to the pseudo power-off mode.

Further, in step ST6, the portable phone 100 of the parent calls the portable phone 1 by a predetermined call operation.

In step ST7, the control section 45 performs a call receiving process for the call performed by the operation of step ST6 (see FIG. 5(*e*)).

In step ST8, the control section 45 switches the pseudo power-off mode into the power-on mode.

In step ST9, since the pseudo power-off mode is switched into the power-on mode through the call receiving process of the operation of step ST7, the control section 45 performs a simple message recoding function of recording a message by activating the message-recording telephone function with reference to the table T1, without performing a normal incoming call operation (for example, an operation of performing a predetermined incoming call display, outputting an incoming call melody and lighting an LED in a state where the backlight of the display section 21 is turned on) (see FIG. 5(*f*)). If it is determined that there is no available capacity in the memory for recording the message, the control section 45 rejects the incoming call, and a predetermined guidance (for example, "Memory is not enough for recording. You cannot leave a message.") is presented to the terminal of the other party. Further, the control section 45 may maintain the power-on mode as it is, thereby allowing normal incoming calls.

In step ST10, the control section 45 stores information about an incoming call source and an incoming call time as the incoming call history.

In step ST11, the end key 11*c* is pressed and held by the user (child) (see FIG. 5(*g*)). For example, it is assumed that an operation of switching the mode into the power-on mode is performed in the portable phone 1 by the user (child) when the user returns home after school. In a case where the power-on mode is already set, the present operation is skipped.

In step ST12, the control section 45 detects the press and hold of the end key 11*c*, and switches the pseudo power-off mode into the power-on mode. At this time, the display image for the power-on mode is displayed on the display section 21 (see FIG. 5(*h*)). Further, after the display image for the power on-mode is displayed, since the incoming call history remains by the operation of step ST9, the control section 45 displays the fact that there is the incoming call history on the display section 21 (see FIG. 5(*i*)).

In step ST13, the operating section 11 receives the operation of the user (child) (message display selection operation). The control section 45 displays the fact that the call is made from the parent, a call receiving time and the fact that the message remains, on the display section 21, based on the operation by the user.

In step ST14, the operating section 11 receives the operation of the user (child) (operation of reproducing recoded message).

In step ST15, the control section 45 performs reproduction of the left message.

In this way, even if the pseudo power-off mode is set, since the function of the message-recording telephone is turned on when the incoming call is made from the predetermined transmitting source, the portable phone 1 can record the message from the predetermined transmitting source and to directly reproduce the message when the pseudo power-off mode is switched to the power-on mode.

Figure 6:
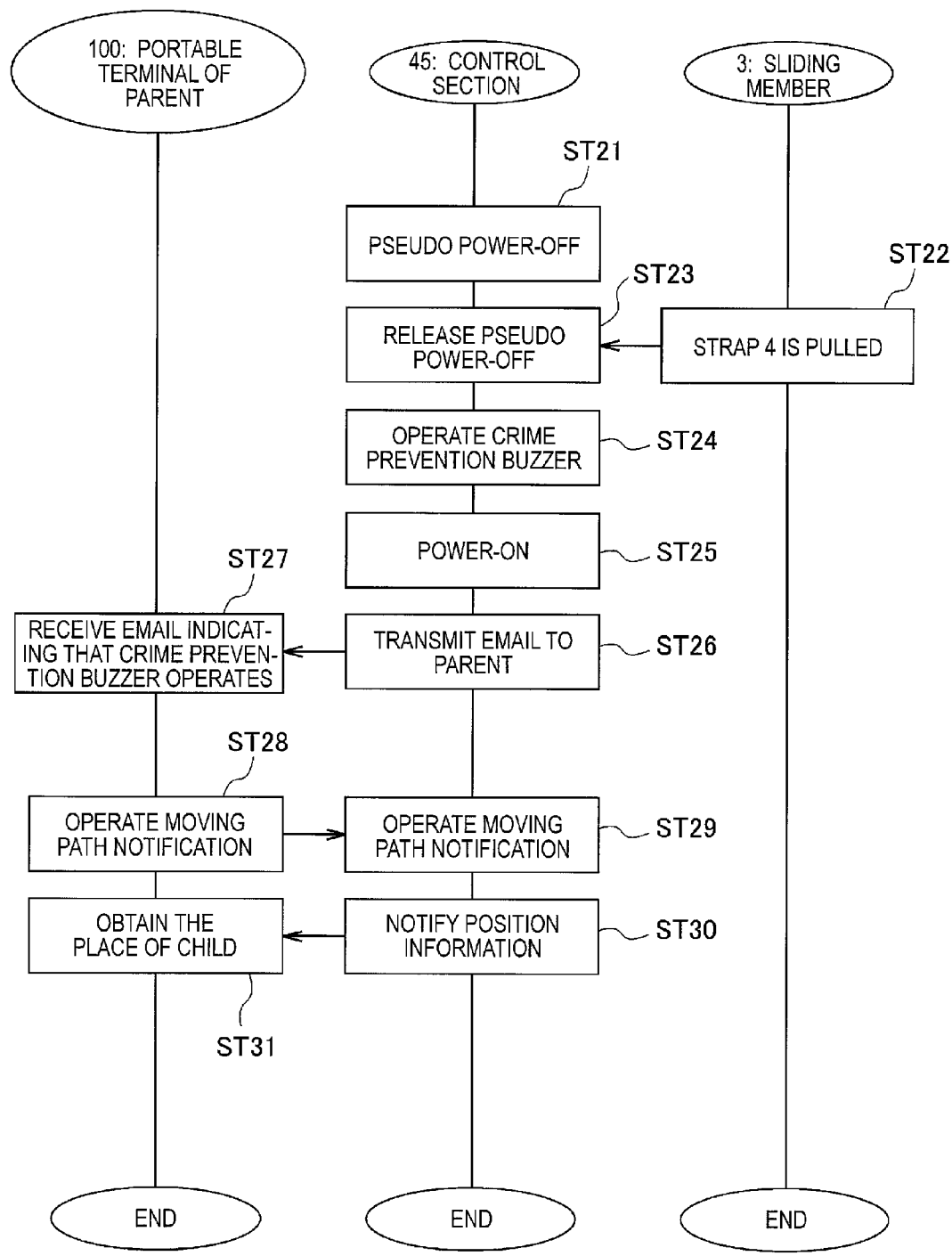
FIG. 6 is a flowchart illustrating operations of a portable phone of a child returning from school and a portable terminal of a parent.

Next, the process when the child returns home from school will be described with reference to FIGS. 6 and 7. In the following illustrative embodiment, it is assumed that the operation of switching the pseudo power-off mode into the power-on mode by the child as in the operation of the step ST10 is not performed.

In step ST21, the control section 45 continues the pseudo power-off mode (see FIG. 7(*a*)).

In step ST22, the sliding member 3 slides by the predetermined amount according to the strap 4 being pulled by the force of the predetermined level or higher. It is assumed that the user (child) of the portable phone 1 pulls the strap 4 by the force of the predetermined level or higher when the child detects danger during returning home from school (see FIG. 7(*b*)).

In step ST23, the control section 45 switches the pseudo power-off mode into the power-on mode.

In step ST24, the control section 45 causes the crime prevention buzzer to sound loudly (see FIG. 7(*c*)). The crime prevention buzzer may sound as the sliding member 3 slides by the predetermined amount when the strap 4 is pulled by the force of the predetermined level or higher, irrespective of the control of the control section 45.

In step ST25, the control section 45 switches the mode into the power-on mode.

In step ST26, the control section 45 sends an urgent notification using the email function to a notification destination which is set in advance (for example, the portable terminal 100 of the parent) (see FIG. 7(*d*)). For example, the control section 45 creates a message such as "Crime prevention buzzer is operated" and transmits the message by email.

In step ST27, the portable terminal 100 of the parent receives the email transmitted by the operation of step ST25. The parent comes to know by this email the fact that the crime prevention buzzer is operated in the portable phone 1 of the child.

In step ST28, the portable terminal 100 of the parent operates a moving path notification function. Here, the moving path notification function is a function of notifying the current position of the portable phone 1 and the moving path thereof using a GPS function which is built-in the portable phone 1.

In step ST29, the control section 45 operates a moving path notification function thereof in association with that the moving path notification function of the portable terminal 100 of the parent is operated.

In step ST30, the control section 45 obtains its position information and transmits the position information to the portable terminal 100 of the parent.

In step ST31, the portable terminal 100 of the parent obtains the position information transmitted from the portable phone 1, and grasps the current position and the movement path of the portable phone 1 (see FIG. 7(e)). For example, the parent can go to meet to take case the child if the current position of the portable phone 1 is close to home.

In this way, the portable phone 1 notifies the parent of the fact that the crime prevention function is activated and the current position, to thereby enhance the crime prevention effect.

Further, as described above, the portable phone 1 can switch the pseudo power-off mode into the power-on mode by a predetermined operation. Here, the predetermined operation is not a normal operation for switching to the power-on mode (for example, long-push operation of the end key 11c) but the operation of the crime prevention function which is effective in the pseudo power-off mode (for example, operation of pulling the strap 4).

Further, the operation of the crime prevention function which is enabled (usable) in the pseudo power-off mode may include a sounding operation of the crime prevention buzzer (operation of an emergency application when the emergency application is set), an operation through an incoming call from a predetermined address or an emergency contact address, an operation through remote lock, a setting operation of an automatic manner mode, or an operation through a specific email (here, the parent menu is not operated).

For example, in a state where the pseudo power-off mode is set, if the crime prevention buzzer is operated, the portable phone 1 releases the pseudo power-off mode and switches into the power-on mode for sound. Further, the portable phone 1 has a function capable of operating or stopping an emergency application if a specific email is received in a state where the pseudo power-off mode is set.

Further, as a different enabled (usable) operation in the pseudo power-off mode, a case where the portable phone 1 owned by the child goes out of a predetermined range (for example, school) during operation of the moving path notification function, a case where a specific email is received by predetermined times or a case where a specific email including predetermined words is received, may be considered.

Further, the portable phone 1 has a function of switching to the pseudo power-off mode by the press and hold of the end key 11c in a standby state. When the mode switches to the pseudo power-off mode, the portable phone 1 displays an end animation for the pseudo power-off mode and cuts off the supply of electric power to the display section 21.

Further, in order to switch the mode into the pseudo power-off mode, the portable phone 1 has a function of transmitting an email to a specific email address (for example, the portable terminal 100 of the parent) which is registered in the address book. During remote lock, the operation of switching the mode into the pseudo power-off mode may not be performed.

Further, in the pseudo power-off mode, the portable phone 1 switches the mode into the power-on mode to return to a standby screen by performing the operation of press and hold of the end key 11c. When returning from the pseudo power-off mode, the portable phone 1 restarts the supply of electric power to the display section 21, and displays a power-on animation without performing an initiation process when normal electric power is supplied.

Further, the portable phone 1 performs the following operation in response to an incoming call. When receiving an incoming call from an emergency notification destination in the pseudo power-off mode, the portable phone 1 performs a normal call reception. Further, when receiving the incoming call in the pseudo power-off mode, if the other party is registered in the address book, the portable phone 1 immediately switches to the message recording mode and records the result as an incoming call history. Further, when receiving the incoming call in the pseudo power-off mode, if the other party is not registered in the address book, the portable phone 1 does not perform a screen display and transmits a predetermined guidance to the other party.

What is claimed is:

1. A portable electronic apparatus comprising: a display section; an operating section; a setting section configured to switch and set, based on an operation of the operating section, a pseudo power-off mode in which electric power is disabled to the display section and a crime prevention function is enabled, and a power-on mode, in which the electric power is supplied to the display section and all functions, including the crime prevention function, are enabled; a control section configured to switch the pseudo power-off mode into the power-on mode when the crime prevention function is used in a state where the pseudo power-off mode is set by the setting section; and a crime prevention key configured to activate a crime prevention buzzer, wherein if the crime prevention key is operated in the state where the pseudo power-off mode is set by the setting section, the control section determines that the crime prevention function is used, activating the crime prevention buzzer, and switching the pseudo power-off mode into the power-on mode, said crime prevention key being a sliding member, said sliding member being connected to the portable electronic apparatus via a strap and said sliding member being configured to slide by a predetermined amount in a specific direction: activating the crime prevention buzzer and wirelessly transmitting out a notification message when the strap is pulled by a predetermined level of force without detaching from the portable electronic apparatus; and during the pseudo power-off mode, a message-recording function turns on when an incoming call is from a registered address.

2. The portable electronic apparatus according to claim 1, further comprising:
a registering section which stores an address registered therein,
wherein when receiving an incoming email or call from the registered address the state where the pseudo power-off mode is set by the setting section, the control section determines that the crime prevention function is used and switches the pseudo power-off mode into the power-on mode.

3. The portable electronic apparatus according to claim 2, wherein the control section transmits an email to the registered address with reference to the registering section if the pseudo power-off mode is set by the setting section based on an operation to of the operating section.

4. The portable electronic apparatus according to claim 2, wherein when receiving the incoming call in the state where the pseudo power-off mode is set by the setting section, the control section switches the portable electronic apparatus into a message-recording mode which records a message from a transmitting source of the incoming call if the incoming call is from an address previously registered in the registering section, and disables the message-recording mode, if the incoming call is from an address which is not previously registered in the registering section.

5. The portable electronic apparatus according to claim 1, wherein the setting section further switches and sets, based on an operation of the operating section, a power-off mode in which the electric power is disabled to the display section and all the functions are disabled, and
wherein when the pseudo power-off mode is set by the setting section based on an operation of the operating section, the control section controls the display section to display a display screen for a predetermined time, the display screen is different from a display screen displayed on the display section when the power-off mode is set and then controls the electric power to the display section to be cut off.

6. The portable electronic apparatus according to claim 1, wherein when receiving an incoming call from an emergency contact address in a state where the pseudo power-off mode is set by the setting section, the control section determines that the crime prevention function is used, switches the pseudo power-off mode into the power-on mode, and accepts the incoming call from the emergency contact address.

7. The portable electronic apparatus according to claim 1, wherein when the pseudo power-off mode is switched into the power-on mode when the crime prevention function is used, the control section again switches the power-on mode into the pseudo power-off mode after a predetermined time elapse.

8. A switching control method for a portable electronic apparatus comprising: switching and setting, based on an operation of an operating section, a pseudo power-off mode in which electric power is disabled to a display section and a crime prevention function is enabled, and a power-on mode, in which the electric power is supplied to the display section, and all functions, including the crime prevention function, are enabled; switching the pseudo power-off mode into the power-on mode when the crime prevention function is used in a state where the pseudo power-off mode is set in the switching and setting; pulling, by a sliding member configured to slide by a predetermined amount in a specific direction, a strap connected between the sliding member and the portable electronic apparatus by a predetermined level of force to activate the crime prevention function; activating a crime prevention buzzer and wirelessly transmitting out a notification message when the strap is pulled by the predetermined level of force or greater than the predetermined level of force without detaching from the portable electronic apparatus; and during the pseudo power-off mode, a message-recording function turns on when an incoming call is from a registered address.

9. A non-transitory computer-readable medium in a portable electronic apparatus having a control program stored thereon and readable by a computer, the control program, when executed by the computer, causing the computer to perform operations, said operations comprising: switching and setting, based on an operation of an operating section, a pseudo power-off mode in which electric power is disabled to a display section and a crime prevention function is enabled, and a power-on mode, in which the electric power is supplied to the display section, and all functions, including the crime prevention function are enabled; switching the pseudo power-off mode into the power-on mode when the crime prevention function is used in a state where the pseudo power-off mode is set in the switching and setting; and pulling, by a sliding member configured to slide by a predetermined amount in a specific direction, a strap connected between the sliding member and the portable electronic apparatus by a predetermined level of force or greater than the predetermined level of force to activate the crime prevention function; and activating a crime prevention buzzer and wirelessly transmitting out a notification message when the strap is pulled by the predetermined level of force or greater than the predetermined level of force without detaching from the portable electronic apparatus; and during the pseudo power-off mode, a message-recording function turns on when an incoming call is from a registered address.

* * * * *